US011299796B2

(12) United States Patent
Nakashima et al.

(10) Patent No.: US 11,299,796 B2
(45) Date of Patent: Apr. 12, 2022

(54) METHOD FOR RECOVERING A MINOR METAL AND/OR RARE-EARTH METAL

(71) Applicants: JX NIPPON MINING & METALS CORPORATION, Tokyo (JP); TOHO TITANIUM CO., LTD., Chigasaki (JP)

(72) Inventors: Kota Nakashima, Hitachi (JP); Akira Yoshimura, Hitachi (JP); Seiichiro Tani, Chigasaki (JP)

(73) Assignees: JX NIPPON MINING & METALS CORPORATION, Tokyo (JP); TOHO TITANIUM CO., LTD., Chigasaki (JP)

( * ) Notice: Subject to any disclaimer, the term of this patent is extended or adjusted under 35 U.S.C. 154(b) by 586 days.

(21) Appl. No.: 16/302,478

(22) PCT Filed: May 12, 2017

(86) PCT No.: PCT/JP2017/018091
§ 371 (c)(1),
(2) Date: Nov. 16, 2018

(87) PCT Pub. No.: WO2017/199887
PCT Pub. Date: Nov. 23, 2017

(65) Prior Publication Data
US 2019/0292630 A1 Sep. 26, 2019

(30) Foreign Application Priority Data

May 16, 2016 (JP) .............................. JP2016-098305

(51) Int. Cl.
| C22B 59/00 | (2006.01) |
| B03B 5/48 | (2006.01) |
| C22B 34/14 | (2006.01) |
| C22B 34/22 | (2006.01) |
| C22B 34/24 | (2006.01) |
| C22B 34/12 | (2006.01) |
| C22B 3/10 | (2006.01) |

(52) U.S. Cl.
CPC ............... *C22B 59/00* (2013.01); *B03B 5/48* (2013.01); *C22B 34/14* (2013.01); *C22B 34/22* (2013.01); *C22B 34/24* (2013.01); *C22B 3/10* (2013.01); *C22B 34/12* (2013.01); *C22B 34/1222* (2013.01); *Y02P 10/20* (2015.11)

(58) Field of Classification Search
CPC ......... C22B 59/00; C22B 34/14; C22B 34/24; C22B 34/22; Y02P 10/20
USPC .......................................... 423/21.1, 62, 69
See application file for complete search history.

(56) References Cited

U.S. PATENT DOCUMENTS

| 4,120,694 A | * | 10/1978 | Eiger .................. C22B 34/1204 75/419 |
| 5,049,363 A | | 9/1991 | Feuling | |

FOREIGN PATENT DOCUMENTS

| AU | 2015310078 A1 | 2/2017 |
| CN | 104874590 A | 9/2015 |
| JP | 34-10901 B1 | 12/1959 |
| JP | 3-115534 A | 5/1991 |
| JP | 4-107224 A | 4/1992 |
| JP | 2016-50166 A | 4/2016 |
| SU | 1475169 A1 | 5/1999 |
| WO | WO 2016/031699 A1 | 3/2016 |

OTHER PUBLICATIONS

SU-1475169, English translation. (Year: 1999).*
International Search Report for PCT/JP2017/018091 dated Aug. 1, 2017.
Chinese Office Action dated May 12, 2020, for corresponding Chinese Application No. 201780028010.8, with an English translation.
Guangxi Zhuang Autonomous Region Local Records Compilation Committee, Editor, "Guangxi General Records Geology and Minerals Journal," Guangxi People's Publishing House, Jul. 1992, pp. 145-146 (5 pages total).
Li et al., "Metallurgical Process Solid Waste Treatment and Recycling," Metallurgical Industry Press, Nov. 2007, p. 271 (4 pages total).
Notification of Transmittal of Translation of the International Preliminary Report on Patentability; International Preliminary Report on Patentability and English translation of Written Opinion of the International Searching Authority, dated Nov. 29, 2018, issued in PCT/JP2017/018091 (Forms PCT/IB/338, PCT/IB/373 and PCT/ISA/237).
Russian Office Action dated Jul. 19, 2019, for corresponding Russian Patent Application No. 2018144244, with English translation.

* cited by examiner

*Primary Examiner* — Steven J Bos
(74) *Attorney, Agent, or Firm* — Birch, Stewart, Kolasch & Birch, LLP

(57) ABSTRACT

An object of the present invention is to recover a minor metal and/or rare-earth metal.
The present invention provides a method for recovering a minor metal and/or rare-earth metal from a post-chlorination residue in titanium smelting.
The minor metal and/or rare-earth metal is one or more metal selected from the group consisting of Sc, V, Nb, Zr, Y, La, Ce, Pr, and Nd.

7 Claims, 4 Drawing Sheets

[Fig 1]
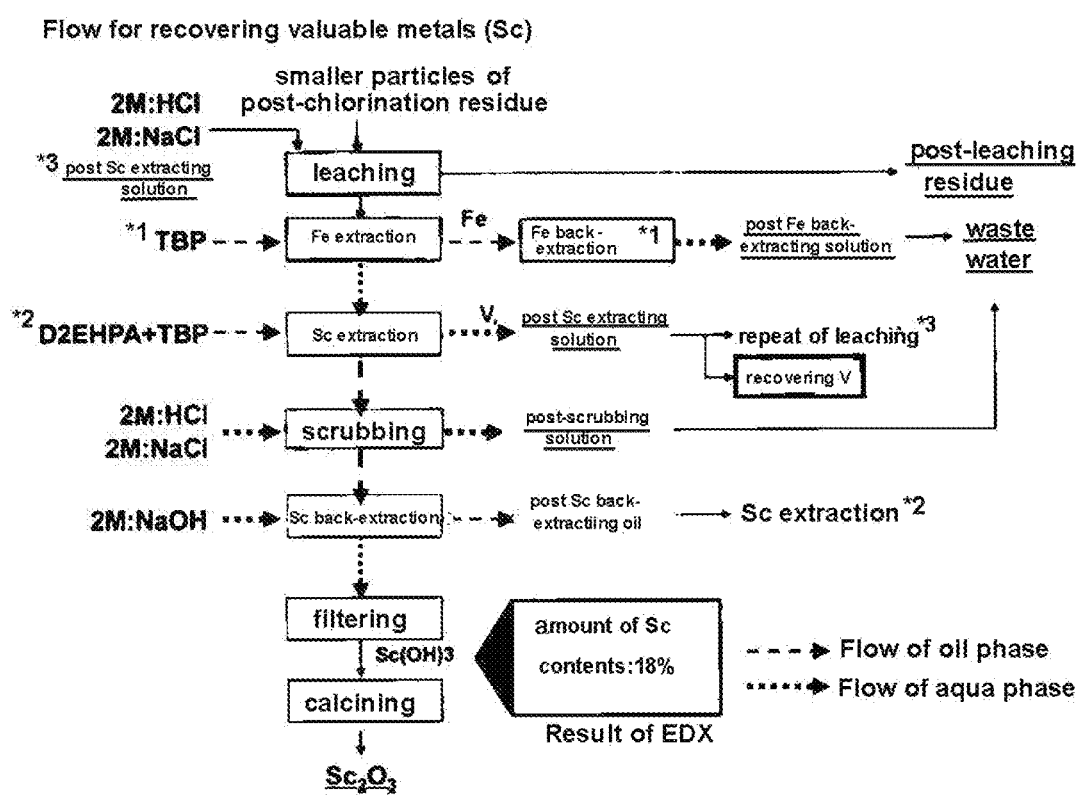

[Fig 2]
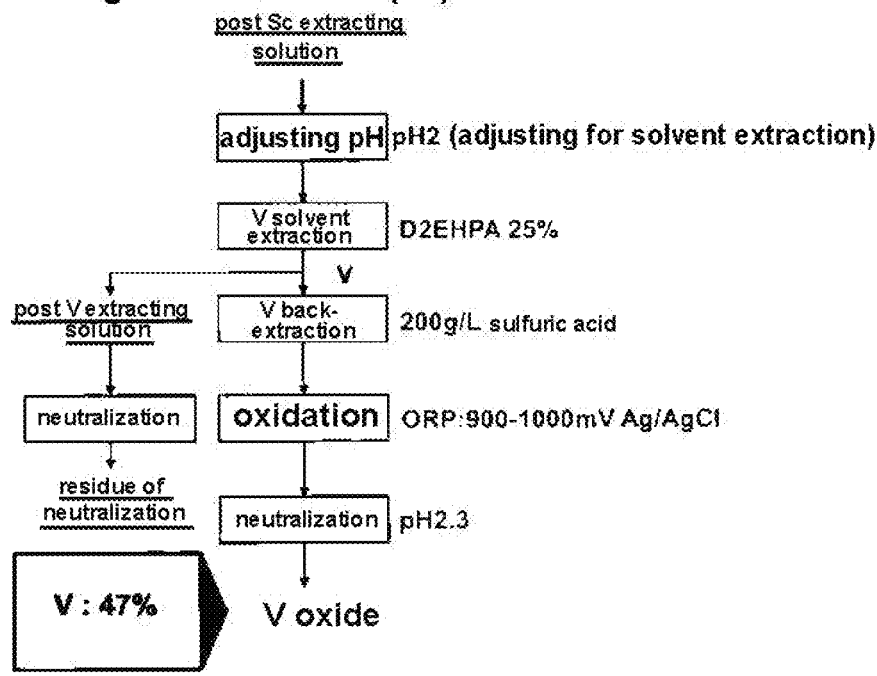
product with an amount of V being 96 % were obtained converting into $(NH_4)_2V_6O_{16} \cdot 1.5 H_2O$
[Fig 3]
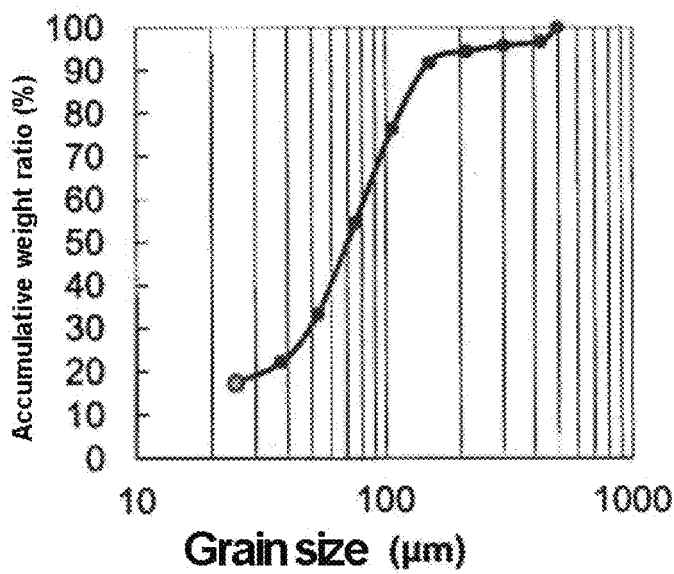

[Fig 4]
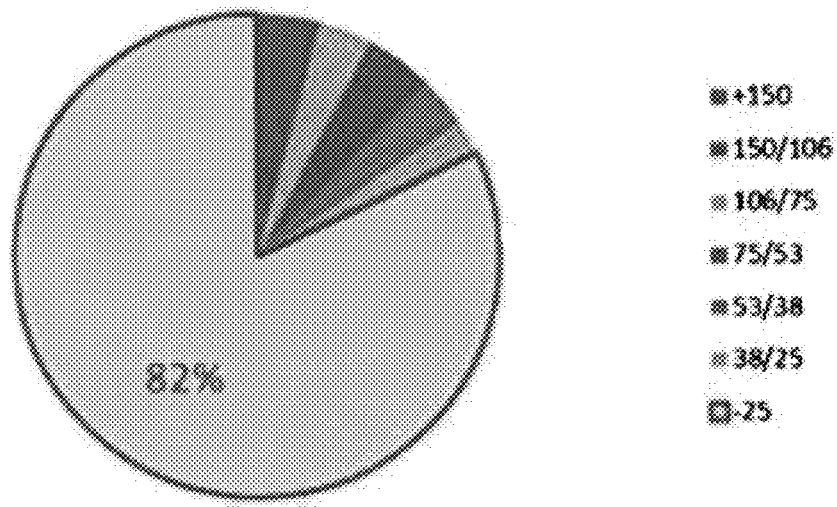
Distribution of Sc
[Fig 5]
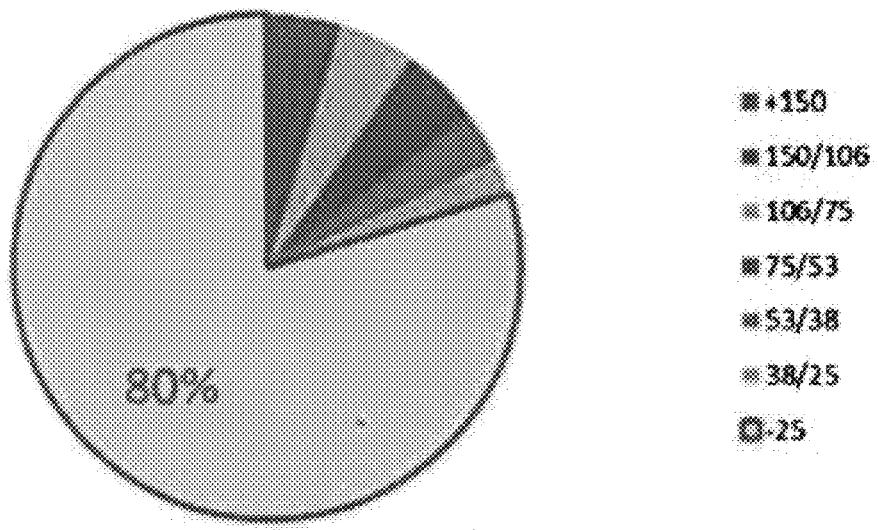
Distribution of V

[Fig 6]
Prior Art (JP2014-181153 A )
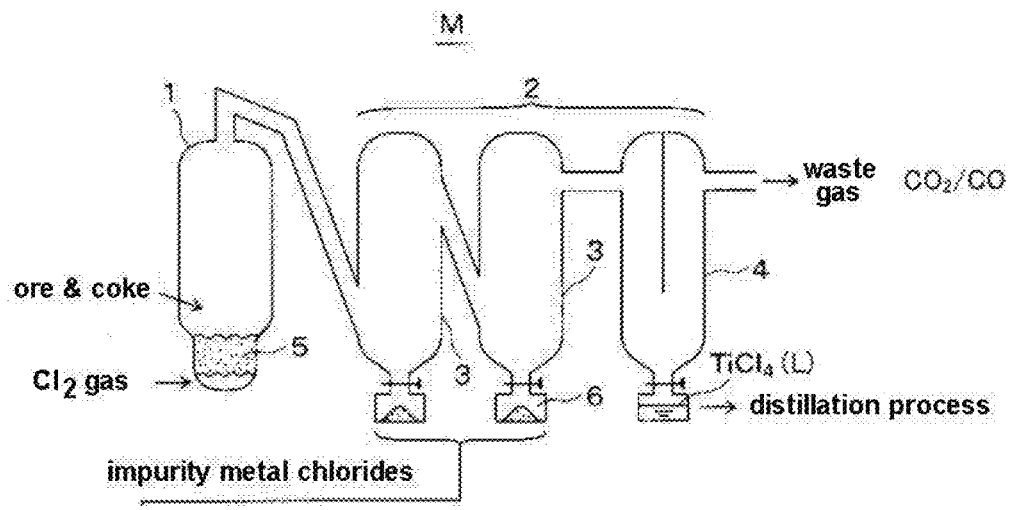

METHOD FOR RECOVERING A MINOR METAL AND/OR RARE-EARTH METAL

FIELD OF INVENTION

The present invention relates to a method for recovering a minor metal and/or rare-earth metal. In particular, the present invention relates to a method for recovering a minor metal and/or rare-earth metal from products generated via a titanium smelting.

TECHNICAL BACKGROUND

Titanium is refined from titanium ore by the Kroll method. In the Kroll method, titanium ore and coke are introduced into a fluidized bed reactor, and then chlorine gas is provided from the bottom of the fluidized bed reactor. As a result, gaseous titanium tetrachloride is produced and then recovered to be reduced by magnesium and the like, and ultimately titanium sponge is produced.

However, titanium ore contains valuable substances other than titanium. Patent Literature 1 discloses a method for recovering valuable substances from titanium ore. Specifically, Patent Literature 1 discloses a method comprising: chlorinating titanium ore, and leaching with HCl from a residue that is obtained via a chlorination reactor.

LIST OF PATENT LITERATURE

[Patent Literature 1] JP H3-115534 A

SUMMARY OF INVENTION

Technical Problem

In the Kroll method, gaseous titanium tetrachloride is produced in a fluidized bed chlorination reactor. The titanium tetrachloride is then recovered in a place other than the fluidized bed chlorination reactor. In the process, a large amount of post-chlorination residue is produced. It takes a lot of cost to dispose the post-chlorination residue as industrial waste. Meanwhile, the post-chlorination residue contains substances that are industrially valuable. An object of the present invention is to provide a method for recovering valuable substances from a post-chlorination residue.

Solution to Problem

The present inventors conducted diligent research and found that as a result of analysis for post-chlorination residue, certain valuable substances are unevenly distributed into a certain size or less.

On the basis of the above discovery, the present invention includes, in one aspect, the following inventions.
(Invention 1)
A method for recovering a minor metal and/or rare-earth metal from a post-chlorination residue in titanium smelting, the method comprising:
classifying the post-chlorination residue into bigger particles and smaller particles; and
recovering the smaller particles,
wherein the minor metal and/or rare-earth metal is one or more metal selected from the group consisting of Sc, V, Nb, Zr, Y, La, Ce, Pr, and Nd.
(Invention 2)
The method according to Invention 1, further comprising recovering the minor metal and/or rare-earth metal from the smaller particles.
(Invention 3)
The method according to Invention 1 or 2, wherein the minor metal and/or rare-earth metal is Sc and/or V.
(Invention 4)
The method according to any one of Inventions 1 to 3, wherein the classifying is wet classifying.
(Invention 5)
The method according to any one of Inventions 1 to 4, wherein the classifying is performed based on the criteria of 55 μm or less.
(Invention 6)
The method according to any one of Inventions 1 to 4, wherein the classifying is performed based on the criteria of 40 μm or less.
(Invention 7)
The method according to any one of Inventions 1 to 4, wherein the classifying is performed based on the criteria of 25 μm or less.
(Invention 8)
The method according to any one of Inventions 1 to 7, the method further comprising:
recovering Sc from the smaller particles; and
recovering V from liquid obtained by the recovering of Sc.

Effect of Invention

In one aspect of the present invention, the method includes classifying a post-chlorination residue in advance, followed by recovering a minor metal and/or rare-earth metal (e.g., Sc, V, and the like). Thereby, it is possible to increase the content of a minor metal and/or rare-earth metal and then to recover the metal. Classifying makes it possible to reduce scale of a subject to be treated (e.g., a subject to be leached from, and a subject to be extracted by a solvent). In other words, comparing to an unclassified subject, it is possible to reduce the scale of a facility for recovering (e.g., leaching, solvent-extraction), which is economically advantageous.

BRIEF DESCRIPTION OF DRAWINGS

FIG. 1 shows the flow diagram of recovering Sc according to the one embodiment of the present invention.
FIG. 2 shows the flow diagram of recovering V according to the one embodiment of the present invention.
FIG. 3 shows, in one embodiment of the present invention, a result of classifying a post-chlorination residue as a whole.
FIG. 4 shows, in one embodiment of the present invention, a result of classifying Sc that is contained in a post-chlorination residue.
FIG. 5 shows, in one embodiment of the present invention, a result of classifying V that is contained in a post-chlorination residue.
FIG. 6 shows the flow of the Kroll method (related art)

DESCRIPTION OF EMBODIMENTS

1. Post-Chlorination Residue
1-1. Titanium Refining
Conventionally, titanium is refined in general from titanium ore by the Kroll method. FIG. 6 shows a part of the flow for the method. Titanium ore and coke are introduced into a fluidized bed reactor. Then, chlorine gas is provided from the bottom of the fluidized bed reactor. Titanium ore reacts with chlorine gas to generate titanium tetrachloride. Titanium tetrachloride exists in the form of gas at a temperature inside the reactor. Titanium tetrachloride in the form of gas is sent to next cooling system to be cooled. The cooled titanium tetrachloride changes into the form of liquid and is then recovered.

1-2. Post-Chlorination Residue

When gaseous titanium tetrachloride is sent to the next cooling system, impurities in the form of fine particles are carried along with the air flow and sent to the cooling system. The impurities include substances other than titanium (iron, scandium, vanadium, niobium, zirconium, aluminum, silicon and the like, some of them may be a chloride), unreacted ore, unreacted coke and the like. These impurities may be recovered in the form of solid in the cooling system. In the present specification, the recovered substances are referred to as "post-chlorination residue." The post-chlorination residue may be converted in the form of slurry, or may be in the form of dried-particles. Typically, the post-chlorination residue in the form of slurry may be used to recover valuable metals.

1-3. Contents of Post-Chlorination Residue

The post-chlorination residue that has been obtained via the above process may contain various minor metals and/or rare-earth metals, such as Sc, V, Nb, Zr, Y, La, Ce, Pr, and Nd which are valuable elements. If these can be recovered, it is possible not only to reduce cost for disposing waste, but also to increase benefit by using the recovered substances. Although the present invention is not limited by the following theories, since post-chlorination residue is a mixture that is generated via the process of titanium smelting, most of the components thereof originate from titanium concentrate. Titanium concentrate may be obtained by subjecting mined titanium ore to froth-floatation, magnetic separation, or gravity concentration and the like, to increase the content of titanium. For this reason, Ti-containing particles, which are of interest, tend to be formed into a relatively large size of particles. Meanwhile, other minor metal elements which are impurities in Ti concentrate are adhered to and mixed in the Ti concentrate, as fine particles in the production of the concentrate.

1-4. Pretreatment of Post-Chlorination Residue

The temperature for the post-chlorination residue as mentioned above is high just after recovering in the process of titanium smelting. Thus, the post-chlorination residue needs to be cooled prior to the treatment for recovering valuable metals. The cooling method is not particularly limited, and the method includes air cooling, water cooling, or the like.

Furthermore, prior to classifying described hereinafter, the post-chlorination residue is preferably washed by water. This is because, such water washing allows water-soluble impurities such as $FeCl_2$ to be removed. In addition, the water washing functions as the cooling stated above.

2. Classification Method

After the water washing, the post-chlorination residue may be classified into bigger particles and smaller particles. The classification method is not particularly limited, and may be wet classification or dry classification. More preferred method is wet classification. This is because if the post-chlorination residue has been washed with water, it need not be dried. Furthermore, as the classification method, a sieve with a certain size of mesh may be employed. For the wet classification, a classifier such as a hydraulic classifier, a horizontal current classifier, or a sedimenting centrifuge may be used. For the dry classification, an air separator or an air-type classifier may also be used.

The criteria of the classification is not particularly limited, and a certain upper limit of size where minor metal and/or rare-earth metal (e.g., Sc, V, Nb, Zr, Y, La, Ce, Pr, or Nd) are contained may be employed as the criteria. For example, the upper limit of the criteria may be 55 μm or less, 40 μm or less, or 25 μm or less. The lower limit of the criteria may be 10 μm or greater, 15 μm or greater, or 20 μm or greater. Thereby, for example, at least about 82% (in the case where the criteria is 25 μm), about 84% (in the case where the criteria is 38 μm), or about 88% (in the case where the criteria is 53 μm) of Sc contained in the post-chlorination residue can be recovered. Furthermore, at least about 80% (in the case where the criteria is 25 μm), about 82% (in the case where the criteria is 38 μm), or about 85% (in the case where the criteria is 53 μm) of V contained in post-chlorination residue can be recovered. Also, other minor metals and/or rare-earth metals may be similarly recovered with certain amounts. Meanwhile, the scale of substances to be recovered may be reduced. Moreover, most of other impurities (such as Fe, coke, unreacted titanium and the like) may be distributed into the fraction of bigger particles.

If the means for classification is a sieve, mesh size may be appropriately determined on the basis of the criteria as mentioned above. For example, if the criteria for classification is 25 μm, the mesh size is 25 μm (500 mesh according to Japanese Industrial Standards (JIS)). Further, substances that have passed through a sieve are classified as smaller particles, and substances that have remained on the sieve are classified as bigger particles.

3. Methods for Recovering Valuable Metals 3-1. A Method for Recovering Sc

Sc may be recovered from the post-chlorination residue by any methods known in the art. For example, the method disclosed by X. Shaoquan et. al, Hydrometallurgy 42 (1996) 337-343 may be employed (see in particular, the section of "5. Extraction of Sc from Sc-contaminating waste fluid from titanium white production"). Alternatively, this method may be preferably modified to recover Sc. Specifically, as shown in FIG. 1, the method of leaching with HCl may be exemplified. First, HCl and NaCl are added to fine particles obtained by classifying the post-chlorination residue to perform leaching treatment. When tributyl phosphate (TBP) is added to a post-leaching solution, Fe moves to an organic phase and other minor metals and/or rare-earth metals such as Sc move to an aqueous phase. Fe in the organic phase may be back-extracted, and then post Fe back-extracting solution is disposed as waste water.

Meanwhile, a mixed solvent of D2EHPA (bis(2-ethylhexyl) phosphate) and TBP is added to the aqueous phase. Thereby, Sc moves to the organic phase, while some elements other than Sc (such as V, Nb, Y, La, Ce, Zr, Pr, or Nd and the like) move to the aqueous phase (post Sc extracting solution). The post Sc extracting solution may be used to recover chemical elements other than Sc.

In addition, HCl and/or NaCl are added as necessary to the organic phase to which Sc has moved, thereby performing scrubbing. This allows a reduction in the contamination of Ti. The aqueous phase after the scrubbing is disposed as waste. Meanwhile, NaOH is added to the organic phase after the scrubbing to back-extract Sc. The solution of the aqueous phase after Sc back-extraction is filtered and calcined. Ultimately, Sc may be recovered in the form of $Sc_2O_3$.

In the above method, HCl and NaCl are added in advance and therefore the amount of Cl, which is important for Fe extraction, may be increased. Meanwhile, the amount of HCl may be reduced. Accordingly, the above method has an advantage of reducing the amount of NaOH used for neutralization.

3-2. Method for Recovering V

V may be recovered from the post-chlorination residue by any method known in the art, similarly to Sc. For example, Keichi Miura et. al. disclose Inorganic Materials, Vol. 6, May, 213-219 (1999), "Recovery of Vanadium from Oil Burning Ash", which may be employed. Alternatively, this method may be preferably modified to recover V. For example, a liquid that has been produced via the process of recovering Sc may be used to recover V. Specifically, as shown in FIG. 2, a method of leaching with HCl may be exemplified. The pH of the leaching solution after the Sc recovering process is adjusted. Specifically, the pH may be adjusted within the range of 1 to 3. Next, D2EHPA is used to move V to the organic phase. Then, a sulfuric acid is used to back-extract V. Further, oxidation and neutralization are performed (pH 2 to 2.5) to ultimately obtain V oxide.

Incidentally, the flow diagram shown in FIG. 2 begins with the post-leaching solution after the Sc recovering process. Alternatively, the processes may be performed using a solution of the aqueous phase prepared by leaching the post-chlorination residue with HCl and NaCl and the like, and removing Fe to the organic phase by using TBP (that is, apart of the Sc recovering step may be omitted).

3-3. Methods for Recovering Other Valuable Metals

In the above description, the methods for recovering Sc and V have been exemplified. However, other elements (such as Nb, Zr, Y, La, Ce, Pr, and Nd and the like) may also be recovered by any methods known in the art.

EXAMPLES

Example 1 Measurement for Grain Size Distribution of Post-Chlorination Residue

The post-chlorination residue is solid substances recovered in a reactor where vapored titanium tetrachloride is recovered in titanium smelting. This post-chlorination residue was obtained from TOHO TITANIUM CO., LTD. Further, this post-chlorination residue was in the form of slurry, which had been already washed with water.

The post-chlorination residue was subjected to classifying. Specifically, the following procedure was performed according to the "JIS Z 8815-1994 Test sieving—General requirements".
(1) A plurality of sieves were piled such that a sieve with a larger mesh was set in a higher layer.
(2) A sample was introduced into the uppermost sieve and then a lid was placed on the sieve.
(3) Vibratory Sieve Shaker (RETSCH AS200) was activated on the condition of "Amplitude: 1.00".
(4) Water was dispersed with shower, and sieving was continued until water leaked from the bottom became transparent.
(5) The sieves were removed from the shaker
(6) The sample was recovered, filtered, and weighed.

The result is shown in FIG. 3. As a result of classification, in the post-chlorination residue, the group of particles that passed through the mesh size of 25 μm accounted for about 20% relative to the total amount. Further, the group of particles that passed through the mesh size of 38 μm accounted for about 22% relative to the total amount, and, the group of particles that passed through the mesh size of 53 μm accounted for about 35% relative to the total amount.

Next, each of the classified group of particles was weighed. Analyses for elements in each group of particles were performed by Alkali fusion—Inductively coupled plasma atomic emission spectroscopy (ICP-AES, Seiko Instruments Inc. SPS7700). The results were shown in FIGS. 4 and 5. In FIG. 4, the distribution "+150" represents the group of particles that has remained on the sieve with the mesh size of 150 μm. The distribution "−25" represents the group of particles that has passed through the sieve with the mesh size of 25 μm. The distribution "150/106" represents the group of particles that has passed through the sieve with the mesh size of 150 μm and has remained on the sieve with the mesh size of 106 μm. It was shown that 82% of Sc existed in the group of particles that has passed through the sieve with the mesh size of 25 μm. Similarly, it was shown that 80% of V existed in the group of particles that has passed through the sieve with the mesh size of 25 μm. Thus, it was shown that when performing classifying according to the criteria of 25 μm, it is possible to reduce the scale while 80% or more of these elements can be distributed. Thereby, the contents of Sc and V that account for the whole group of particles may be increased and the amount of recovery may be improved. Alternatively, even when performing classifying according to any criteria that is larger than 25 μm to some extent (e.g., 55 μm or less, 40 μm or less), similar effect can be achieved.

Moreover, similar analyses for the other elements were performed. The result is shown in the following table. Zr, Nb and the like were shown to be unevenly distributed into the fraction of smaller particles as similar to Sc and V. This indicates that regarding to elements for minor metals and/or rare-earth metals, classifying can reduce the scale and also increase the amount of their contents.

TABLE 1

| Distribution (μm) | Weight % | Zr % | V % | Nb % | Sc % |
| --- | --- | --- | --- | --- | --- |
| +150 | 8.4 | 5.1 | 1.8 | 2.7 | 1.9 |
| 150/106 | 15.4 | 3.9 | 3.0 | 3.5 | 2.4 |
| 106/75 | 21.9 | 8.6 | 4.8 | 6.3 | 3.5 |
| 75/53 | 21.2 | 9.7 | 5.2 | 8.2 | 4.7 |
| 53/38 | 11.1 | 4.5 | 3.2 | 4.7 | 3.3 |
| 38/25 | 4.7 | 2.3 | 2.3 | 2.3 | 2.2 |
| −25 | 17.3 | 65.8 | 79.7 | 72.3 | 82.0 |

Example 2

Contents of Sc and V in Particles after Classification

Regarding to the above-mentioned post-chlorination residue, analyses for elements were performed by a method as similar to the case of Example 1. After that, the post-chlorination residue was subjected to classifying with use of a sieve with the mesh size of 500 mesh (JIS, mesh size of 25 μm) (conditions for classifying were the same as those of Example 1). Then, smaller particles that passed through the sieve were recovered to be analyzed for elements. The result is shown in the following table. As a result, most of Sc and V that had ever existed in the post-chlorination residue prior to the classification was shown to be distributed into the fraction of smaller particles after classification. In addition, after the classification, the contents of Sc and V in the total amount of the smaller particles increased. Regarding to the other elements, a similar tendency was observed. Meanwhile, comparing to the amount of the original ore, the scale of smaller particles reduced to about 10%.

TABLE 2

|  | Weight g | V % | Sc g/t | Y g/t | La g/t | Ce g/t | Pr g/t | Nd g/t |
|---|---|---|---|---|---|---|---|---|
| Lot A original ore | 190 | 0.2 | 110 | 370 | 80 | 220 | 25 | 100 |
| Lot A Bigger particles | 145 | 0.25 | 65 | 270 | 70 | 200 | 25 | 81 |
| Lot A Smaller particles | 19 | 1.2 | 500 | 1100 | 170 | 320 | 39 | 230 |

What is claimed is:

1. A method for recovering a minor metal and/or rare-earth metal from a post-chlorination residue, the method comprising:

classifying the post-chlorination residue into a first set of particles and a second set of particles, the first set of particles having particles that are bigger than particles in the second set of particles recovering the smaller particles, and leaching the minor metal and/or rare-earth metal from the smaller particles into solution, wherein the post-chlorination residue is produced as by-product in a process of titanium smelting, wherein the minor metal and/or rare-earth metal is one or more metal selected from the group consisting of Sc, V, Nb, Zr, Y, La, Ce, Pr, and Nd, and wherein the classifying is performed based on the criteria of a particle size of 55 μm or less.

2. The method according to claim 1, further comprising recovering the minor metal and/or rare-earth metal from the smaller particles.

3. The method according to claim 1, wherein the minor metal and/or rare-earth metal is Sc and/or V.

4. The method according to claim 1, wherein the classifying is wet classifying.

5. The method according to claim 1, wherein the classifying is performed based on the criteria of a particle size of 40 μm or less.

6. The method according to claim 1, wherein the classifying is performed based on the criteria of a particle size of 25 μm or less.

7. The method according to claim 1, the method further comprising: recovering Sc from the smaller particles; and recovering V from liquid obtained by the recovering of Sc.

* * * * *